(12) United States Patent
Ferwerda et al.

(10) Patent No.: US 9,129,104 B2
(45) Date of Patent: Sep. 8, 2015

(54) SYSTEM AND METHOD OF SECURITY MANAGEMENT FOR A VIRTUAL ENVIRONMENT

(71) Applicant: Oracle International Corporation, Redwood Shores, CA (US)

(72) Inventors: Paul Ferwerda, Bedford, NH (US); John Herendeen, Upton, MA (US); Richard P. Mousseau, Stratham, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 185 days.

(21) Appl. No.: 13/866,954

(22) Filed: Apr. 19, 2013

(65) Prior Publication Data

US 2013/0239109 A1 Sep. 12, 2013

Related U.S. Application Data

(63) Continuation of application No. 12/618,609, filed on Nov. 13, 2009, now Pat. No. 8,429,650.

(60) Provisional application No. 61/114,773, filed on Nov. 14, 2008.

(51) Int. Cl.
| | |
|---|---|
| *G06F 9/455* | (2006.01) |
| *H04L 29/06* | (2006.01) |
| *H04L 9/32* | (2006.01) |
| *G06F 7/04* | (2006.01) |
| *G06F 21/44* | (2013.01) |
| *G06F 9/50* | (2006.01) |

(Continued)

(52) U.S. Cl.
CPC ............ *G06F 21/445* (2013.01); *G06F 9/5027* (2013.01); *G06F 21/53* (2013.01); *G06F 21/552* (2013.01); *G06F 2209/501* (2013.01); *G06F 2209/508* (2013.01); *G06F 2209/5011* (2013.01); *G06F 2221/2101* (2013.01); *G06F 2221/2149* (2013.01); *Y02B 60/142* (2013.01)

(58) Field of Classification Search
None
See application file for complete search history.

(56) References Cited

U.S. PATENT DOCUMENTS 6,324,580 B1 * 11/2001 Jindal et al. ................... 709/228
6,327,622 B1 * 12/2001 Jindal et al. ................... 709/228

(Continued)

OTHER PUBLICATIONS

Park, H. et al., Client Certificate and IP Address Based Multi-Factor Authentication for J2EE Web Applications, 8 pgs, 2007.

*Primary Examiner* — Adam Lee
(74) *Attorney, Agent, or Firm* — Tucker Ellis LLP

(57) ABSTRACT

A system and method can support security management in a computing environment that includes one or more virtualized machines to which one or more applications can be deployed. The system can include a plurality of agents, wherein each agent resides on one of a plurality of machines in the computing environment and operates to manage software processes and resources running in the computing environment. The system also includes a controller that collects data from the plurality of agents about current operating performance of the computing environment, and uses the data gathered to enforce policies and to deploy services in a way that honors one or more service level agreements of the deployed services. Furthermore, the communication between each of the plurality of agents and the controller can be secured with a mutual authentication method, and the communication between an agent and an application is secured with a one-way authentication method.

18 Claims, 8 Drawing Sheets

(51) Int. Cl.
*G06F 21/53* (2013.01)
*G06F 21/55* (2013.01)

(56) References Cited

U.S. PATENT DOCUMENTS

| | | | |
|---|---|---|---|
| 7,793,307 B2 | 9/2010 | Gokhale et al. | |
| 8,176,168 B1 | 5/2012 | Ramamurthy | |
| 8,667,500 B1 * | 3/2014 | Ji et al. | 718/105 |
| 2002/0056043 A1 * | 5/2002 | Glass | 713/179 |
| 2002/0071567 A1 | 6/2002 | Kurn et al. | |
| 2006/0149576 A1 | 7/2006 | Ernest et al. | |
| 2007/0078988 A1 | 4/2007 | Miloushev et al. | |
| 2007/0083648 A1 | 4/2007 | Addleman et al. | |
| 2007/0130286 A1 | 6/2007 | Hopmann et al. | |
| 2007/0234408 A1 * | 10/2007 | Burch et al. | 726/6 |
| 2008/0005798 A1 * | 1/2008 | Ross | 726/26 |
| 2008/0034367 A1 * | 2/2008 | Patrick et al. | 718/101 |
| 2008/0046581 A1 * | 2/2008 | Molina et al. | 709/229 |
| 2008/0082645 A1 | 4/2008 | Rachitsky et al. | |
| 2008/0082977 A1 * | 4/2008 | Araujo et al. | 718/1 |
| 2008/0098457 A1 | 4/2008 | Carter | |
| 2008/0133294 A1 * | 6/2008 | Kataria et al. | 705/7 |
| 2008/0163194 A1 | 7/2008 | Dias et al. | |
| 2008/0243629 A1 | 10/2008 | Chang et al. | |
| 2008/0320580 A1 * | 12/2008 | Hamilton et al. | 726/11 |
| 2009/0019134 A1 | 1/2009 | Bellifemine et al. | |
| 2009/0113531 A1 | 4/2009 | Emmerich et al. | |
| 2009/0125619 A1 * | 5/2009 | Antani | 709/223 |
| 2009/0199178 A1 | 8/2009 | Keller et al. | |
| 2009/0276772 A1 | 11/2009 | Garrett et al. | |

* cited by examiner

SYSTEM AND METHOD OF SECURITY MANAGEMENT FOR A VIRTUAL ENVIRONMENT

CLAIM OF PRIORITY

This application is a continuation of U.S. patent application Ser. No. 12/618,609 filed Nov. 13, 2009, entitled "System and Method of Security Management For a Virtual Environment," which claims the benefit of priority on U.S. Provisional Patent Application No. 61/114,773 filed Nov. 14, 2008, entitled "System and Method of Security Management For a Virtual Environment," which applications are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This invention relates generally to the management of application services in an enterprise environment, and, particularly, to a system and method for deploying and managing software services in virtualized and non-virtualized environments.

BACKGROUND

Organizations that utilize enterprise and application server software as part of their enterprise infrastructure are increasingly adopting virtualization technologies as part of their drive to increase utilization and reduce infrastructure costs, while at the same time improving their ability to respond rapidly to a new line of business initiatives.

Hypervisor-based virtualization platforms allow the organization to consolidate their information technology deployments onto a much reduced number of servers running powerful multi-core processors, which, in turn, host multiple virtual machines running applications in their own protected, virtualized environments. As a result, organizations have been able to optimize their physical infrastructure by pooling hardware and storage resources, reduce physical space, ease power and cooling costs, and improve application availability.

Recently, the focus has shifted to application virtualization—technologies that help information technology operations to package, deploy, monitor and control enterprise applications in these new virtual data centers to achieve flexible, dynamic operations that are more responsive, highly available and efficient. This is the area that embodiments of the present invention are designed to address.

SUMMARY

A system and method can deploy and manage software services in virtualized and non-virtualized environments. The enterprise application virtualization solution allows for centralized governance and control over software and Java applications. In accordance with an embodiment, the system uses a plurality of agents to manage the software processes and resources running in the computing environment. In accordance with an embodiment, the system also uses a controller to collect data from the agents about the current operating performance of the computing environment and to deploy the services in a way that best honors the service level agreements of all deployed services. The communication between each of the plurality of agents and the controller is secured with a mutual authentication method.

A system and method can support security management in a computing environment that includes one or more virtualized machines to which one or more applications can be deployed. The system can include a plurality of agents, wherein each agent resides on one of a plurality of machines in the computing environment and operates to manage software processes and resources running in the computing environment. The system also includes a controller that collects data from the plurality of agents about current operating performance of the computing environment, and uses the data gathered to enforce policies and to deploy services in a way that honors one or more service level agreements of the deployed services. Furthermore, the communication between each of the plurality of agents and the controller can be secured with a mutual authentication method, and the communication between an agent and an application is secured with a one-way authentication method.

BRIEF DESCRIPTION OF THE FIGURES

FIG. 4 is an illustration that shows a screenshot of an Administrative Console or interface, in accordance with an embodiment.

FIG. 7 is an illustration that shows another screenshot of an Administrative Console interface that allows for setting of filters, in accordance with an embodiment.

DETAILED DESCRIPTION

Figure 1:
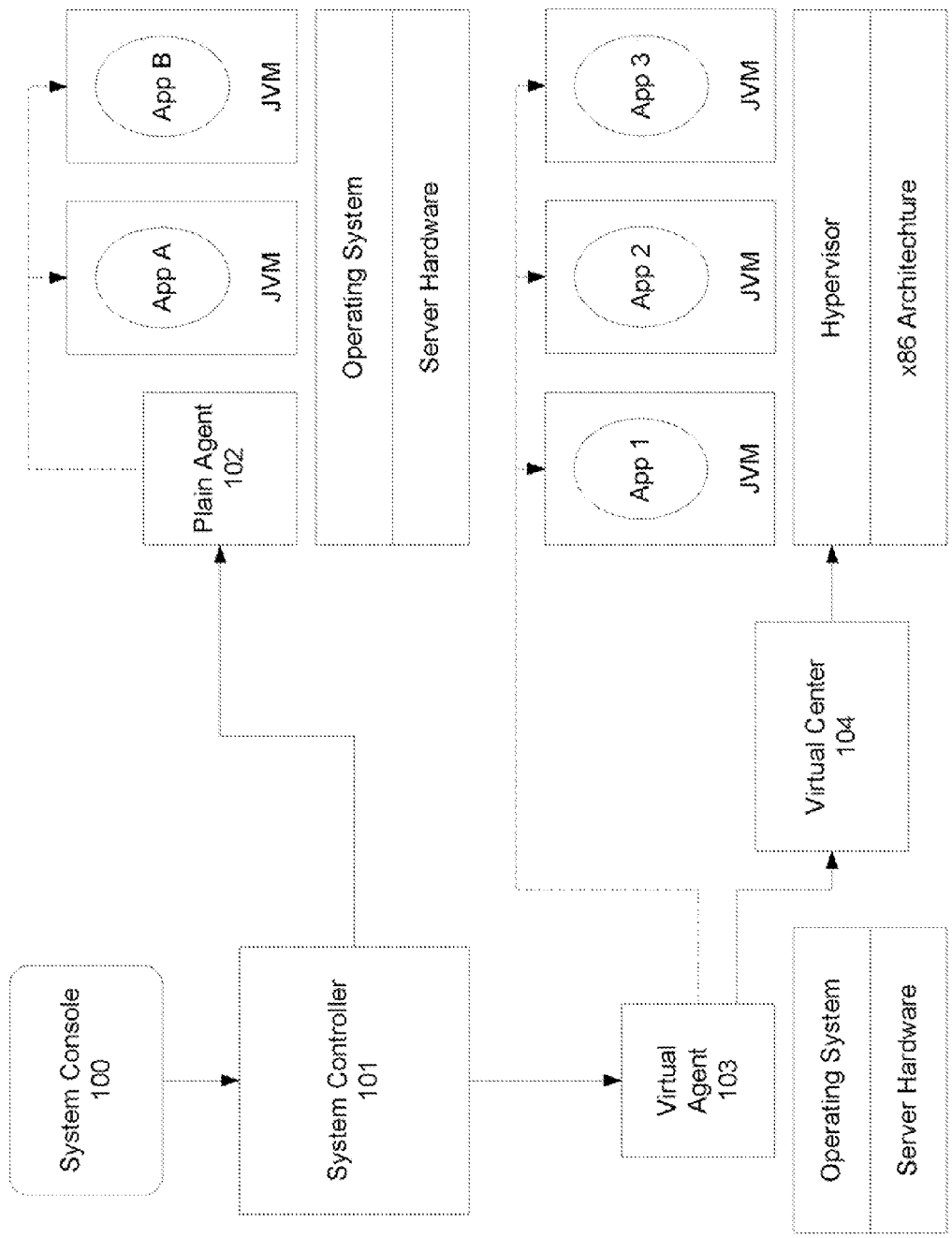
FIG. 1 is an illustration that shows the architecture of a system for deploying and managing software services, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses WebLogic® application server functions or libraries as an example for application server functions or libraries. It will be apparent to those skilled in the art that other types of application server functions or libraries can be used without limitation.

The description of the invention as following also uses Java® Virtual Machine functions or libraries as an example for virtual machine functions or libraries. It will be apparent to those skilled in the art that other types of virtual machine functions or libraries can be used without limitation.

In accordance with an embodiment, the system provides an enterprise application virtualization solution that allows for centralized governance and control over software and Java applications. Operation teams can define policies, based on application-level service level agreements (SLA) that govern the allocation of hardware and software resources to ensure that quality of service (QoS) goals are met across virtual and non-virtualized platforms. When pre-defined conditions occur, a controller dynamically apportions resources to applications or services by invoking the deployment capabilities of the underlying infrastructure. This allows organizations to take advantage of the computing power available from modern processing systems and hypervisor-based virtualization technology. Applications can be deployed on a pool of virtual resources and dynamically extended or re-configured to meet runtime requirements, without constant monitoring by system operators.

In accordance with an embodiment, application administrators can set policies that govern such features as how many servers must be available in a given domain, the maximum load that those servers should support, the response time required for individual services, and other important Service Level Agreement (SLA) metrics. If any of these parameters are breached, the system can respond immediately by provisioning further server instances, migrating existing instances to more suitable resources, or taking other actions to reconfigure the application's runtime environment.

In accordance with an embodiment, the system automatically maps application activity to the most appropriate resources of the underlying platform, so that in a virtualized environment the system can invoke hypervisor-based services to clone, deploy or to migrate servers; while in a non-virtualized operating system (OS)-based environment, the system can start additional resources wherever they have been defined. The system can also provide application-level monitoring and automation for all Java applications, whether those applications are running virtualized or on a dedicated server. In a typical organization, the information operations can contain a mixture of virtual and dedicated servers (since not all applications can be effectively virtualized and in some cases a mixed architecture may be appropriate). Using the system herein, an organization is able to control and optimize Java applications both at the Java Virtual Machine (JVM) and application server layers, regardless of how and where those applications are running.

In accordance with an embodiment, the system comprises two principal components: a Controller, and one or more Agents. The Controller maintains a secure repository of service deployments and SLA policies that are monitored by the system, with a high-performance customizable rules engine that allows the system administrator to specify what actions should be taken when those service levels are at risk. The Controller monitors JVM, application and other metrics, and is able to perform configuration changes and provide process control, so that operations teams can automate key tasks aimed at maintaining application quality of service (QoS), such as provisioning new server instances or migrating existing deployments to alternative hardware resources, based on the runtime behavior of applications and the SOA services that underpin them. The Controller can determine optimal resource placement for service deployments and JVM creations by matching service deployment requirements with specific resource pool capabilities. Action pipelines can be defined to allow complex, sequenced activities to be initiated in response to an event or condition and calendar-based rules allow scheduling of actions to be performed on a one-off or periodic basis.

Agents manage the virtualized or non-virtualized resources that make up the application domain to be managed. These can be virtual appliances (for example, WLS-VE) running on hypervisor-based virtualization platforms, dedicated app server, or JVM-based deployments. Agents determine the resource capabilities of the managed resource environment, and provide appropriate process control operations and platform-specific runtime information. Agents collect and aggregate a rich variety of information about the resources and services they monitor, which they return to the Controller.

The Controller and Agents can run within virtual machines, or on dedicated servers. For example, in some embodiments the Controller can run on its own, dedicated server, as can the Virtualized Agent which manages the server instances running in virtual machines on the hypervisor. Virtualized server resources, process control and virtual machine monitoring can be performed via API calls. Both virtualized and non-virtualized resources can be controlled in a single domain. In accordance with a particular embodiment, the system and features thereof are referred to as a Liquid Operations Control (LOC) system. These and other features and benefits are described in further detail below.

GLOSSARY

The following terms are used throughout this document:

Controller—A centralized component or process that gathers data about the operating environment from Agents. The Controller uses the data gathered to enforce policies and to deploy new services in a way that best honors the SLA of all deployed services. The Controller hosts the Administration Console.

Agent—A component or process that provides information about the environment to the Controller, starts and stops processes, and invokes other actions at the request of the Controller. In accordance with an embodiment, the system can use two types of Agents: a Plain Agent for managing any type of Java process, that renders the resources from the machine on which it resides as a resource pool; and a Virtualized Agent for managing instances of Application Server running in a virtualized environment, that renders the virtualized resource pools as system-accessible resource pools, and can reside on any machine in the operations center that has access to the virtualized environment.

Administration Console—A graphical user interface that an administrator can use to configure, manage, and monitor services in the operations center.

Managed Java Process—A process instance initiated by the system and then monitored.

Action—A software class that can display alert messages in the Administration Console, send notifications, or change the runtime state of a service. Actions can be adjudicated, requiring user input before the system invokes the action pipeline. Actions can be invoked by the Controller as part of enforcing a policy, or manually from the Administration Console.

CPU cycles/Computer Power—A measurement of the CPU resources that a resource pool can supply and that a service needs. The measurement can be normalized across CPU architectures so that a megahertz of processing on an i386 processor is comparable to a megahertz on other types of processors.

Hypervisor—Virtualization software that allows multiple operating systems to run on a single physical computer at the same time.

JMS—Java Message Service.

JMX—Java Management Extensions.

JVM—Java Virtual Machine.

Managed Environment/LOC environment—The collection of all resource pools, services, processes, Agents and Controller in a single installation at an organization.

Machine/Server—Either a physical machine or a virtual machine.

Metric—A numeric runtime value that describes the performance of a process or process group and the resource environment. Some metrics are aggregations or calculations of raw (observed) data. Policies set constraints on metrics.

Physical Host—The physical machine that is hosting a Controller, an Agent or any of the processes that the system is managing, including, virtual machines that the system has started.

Policies—Runtime requirements for a service and actions to take when the service operates outside the requirements. In accordance with an embodiment, each policy comprises two parts: a single constraint and an action or pipeline of actions. Multiple policies can be created for each service. Policies can apply to the resource environment, all processes in a service, to a group of processes (process type), or to a single process.

Process/Application—A program that the system manages. For example, a single application server managed server can be considered a process. From the perspective of the system, a Java process consists of an entire JVM stack and includes any application server and applications being managed.

Process Group/Process Type—A collection of processes in a service for which policies can be written. For example, a process group can contain three application server instances, and a policy can be written that starts all three server instances when the service is deployed.

Resource Pool/Computer Resource—A virtual environment, or a physical environment, in which services can be deployed. Each resource pool provides access to physical computing resources (such as CPU cycles, memory, and disk space) and pre-installed software that a service needs to run. A resource pool also contains a description of the failover capabilities of the machines that host the computing and software resources.

Service/Application—A collection of one or more processes that the system manages as a unit. Each process in a service is a software stack starting from the Java Virtual Machine (JVM) and including the classes that are running in the JVM. For example, in some embodiments a service can be created for managing a single application server instance on which is deployed a single Java EE application. Alternatively, a service can be created for managing all server instances in a cluster. In accordance with an embodiment, a service specifies requirements for the physical computing resources that are needed to run all of its processes, expressed as a range of CPU cycles, memory, and disk space, an optional set of policies that define an SLA, and actions to take when the service is operating outside of the SLA. Metadata can also be provided that defines the Java classes or other executables that comprise the service processes.

System Environment

In accordance with an embodiment, a system is provided which includes a management framework for virtualized and non-virtualized enterprise Java applications. A layer of abstraction is provided over complex operation environments that enable operation staff to think in terms of supply and demand. The framework also offers a policy-based framework for creating and automatically enforcing service level agreements for Java applications, and allows the system to monitor resources across the operations center and distribute the deployment of Java applications in a manner that ensures the overall efficient use of resources.

On the demand side, the system can be used to organize Java applications (processes) into services. Typically, a group of related processes are organized into a single service and the group is then managed as a unit. Alternatively, one service can be created for each process. On the supply side, the system can be used to organize the computer resources in an operations center into collections of resources, or resource pools. A resource pool can represent a single physical machine or a collection of virtualized resources that are made available through Hypervisor software. In accordance with an embodiment, the system provides an environment for encapsulating an SLA as a collection of requirements and policies. The operation team can define policies based on application-level SLA that govern the allocation of hardware and software resources, ensuring that quality of service (QoS) goals are met across virtual and non-virtualized platforms.

FIG. 1 is an illustration that shows the architecture of a system for deploying and managing software services, in accordance with an embodiment. As shown in FIG. 1, a typical deployment contains a single Controller 101, and multiple Agents 102 and 103 that manage and monitor resources and communicate that information back to the Controller 101. The Controller 101 gathers data about the operating environment from the Agents 102 and 103. The Controller 101 then uses the data gathered to intelligently deploy new services and to evaluate and enforce policies to honor the SLA for all services in the environment. The Controller 101 also hosts the Administration Console 100 that enables an administrator to visually configure, manage, and monitor the environment.

When predefined conditions occur, the system dynamically allocates resources to services. The system then monitors the use of resources across the operations center and distributes the deployment of Java applications in a manner that ensures the most efficient use of resources overall. When a service is deployed, or when a system action requests that an additional process be started, the system examines all resource pools to determine where to host the service or process. To choose a resource pool, the system first eliminates any resource pool that cannot satisfy particular dependencies (such as IP addresses or access to software. For example, if a service requires access to Application Server software, then the system eliminates any resource pools that cannot provide access to Application Server software). After considering declared dependencies, the system then considers the capacity of each remaining resource pool, the SLA of any services that are currently deployed, and the relative priorities declared for each service. It then uses an appropriate algorithm to determine which resource pool to use.

One example is based on most resources available. In this approach the system chooses the resource pool that currently has the most excess capacity. For example, if resource pool A has 600 MHz of CPU and 600 MB of RAM that are currently unused, and resource pool B has 400 MHz of CPU and 400 MB of RAM that are unused, then the system chooses resource pool A.

Another example is based on most efficient use of resources. In this approach, the system chooses the resource pool that has just enough unused resources to satisfy the minimum resource requirements of a deployment request. This algorithm ensures the system is best positioned to handle services whose resource requirements are larger than the current request. For example, if resource pool A has 600 MHz of CPU and 600 MB of RAM that are currently unused, and resource pool B has 400 MHz of CPU and 400 MB of RAM that are unused, and if a service is deployed with a minimal requirement of 200 MHz of CPU and 200 MB of RAM, then the system chooses resource pool B.

System Controller

Figure 2:
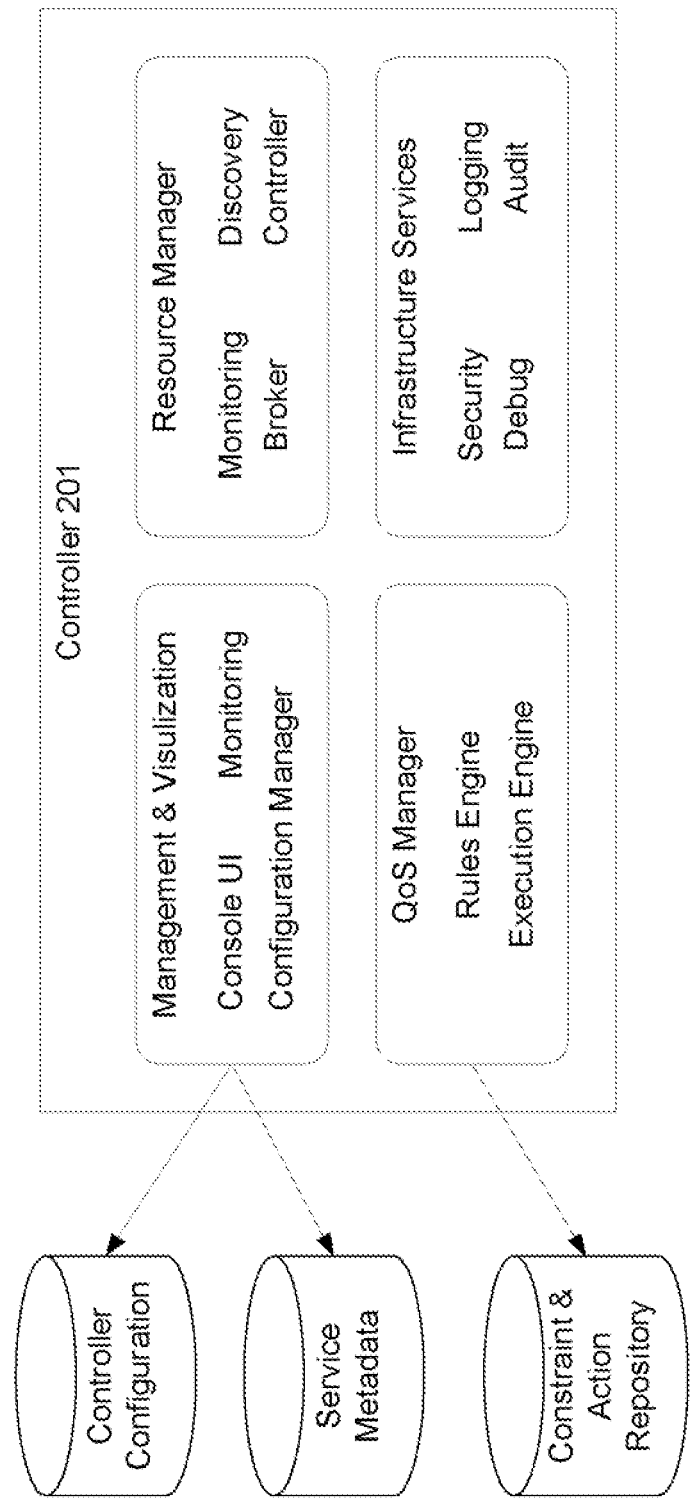
FIG. 2 is an illustration that shows the architecture of a Controller for use with the system, in accordance with an embodiment.

FIG. 2 is an illustration that shows the architecture of a Controller 201 for use with the system, in accordance with an embodiment. Each instance of the system environment includes a single Controller 201. The Controller 201 is responsible for hosting the Administration Console that enables the administrator to visually configure, manage, and monitor the environment; managing resource pools; managing the creation of services; managing the creation of SLA agreements; and, providing logging and audit trails.

To manage resource pools, the Controller communicates with Agents to determine the computing resources that each Agent is capable of allocating and selects appropriate resource pools for deploying services. To adapt the system environment to best meet the SLA of all deployed services, the Controller communicates with Agents to gather metrics. It also compares policy constraints against the metrics and invokes actions when services operate outside the constraints. The Controller configuration, service metadata, and SLA information are stored as XML files and stored locally on the machine that is hosting the Controller.

System Agents

Figure 3:
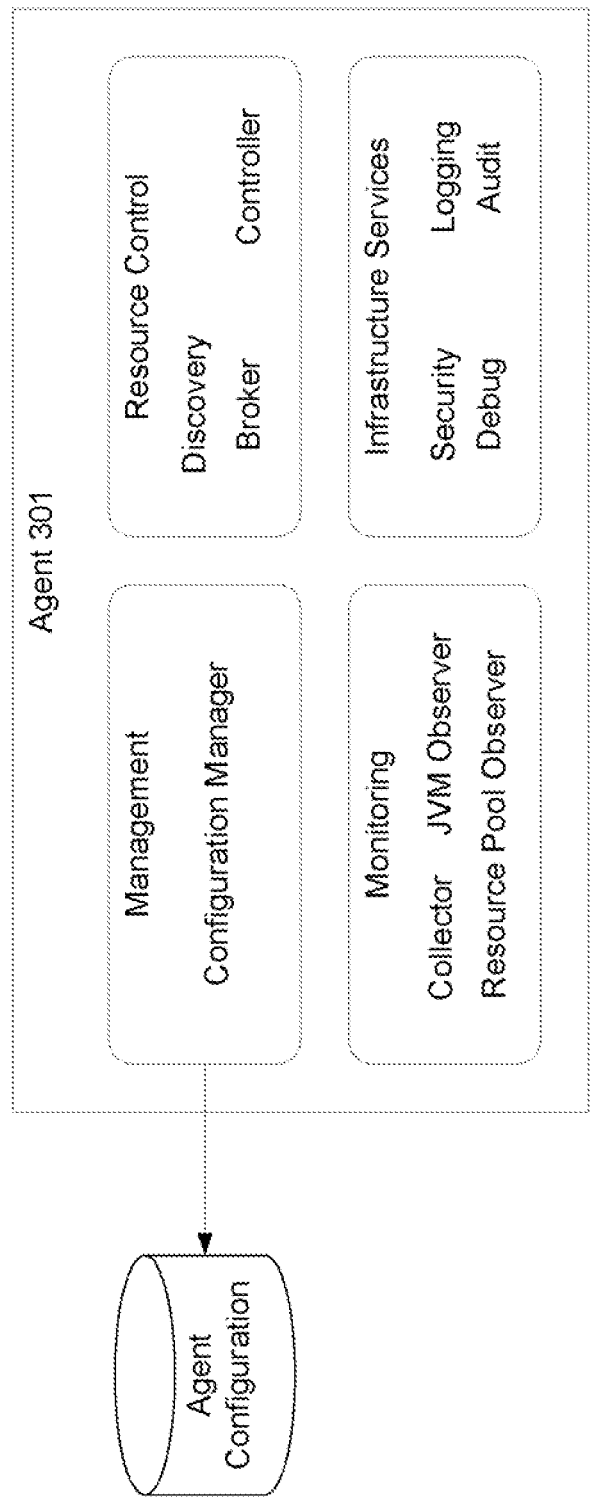
FIG. 3 is an illustration that shows the architecture of an Agent for use with the system, in accordance with an embodiment.

FIG. 3 is an illustration that shows the architecture of an Agent 301 for use with the system. In accordance with an embodiment, an Agent 301 is a standalone Java process that renders the CPU cycles and memory of a machine or a collection of virtual resources as resource pools for use by services. As described above, in accordance with an embodiment, the system supports two types of Agents: a Plain Agent for managing any type of Java process, and that renders the resources from the machine on which it resides as a resource pool; and, a Virtualized Agent for managing instances of Application Server running in a virtualized environment, and that renders virtualized resource pools as system resource pools. Agents can use XML documents to save information about the resources that the Agent exposes for use by the system. Agents can also use unique identifiers for each of the managed processes being managed by that Agent.

In accordance with an embodiment, a Virtualized Agent can communicate with the Virtual Center or similar process, to gather data about the resource pools that are available for use by the system and to manage instances of Application Server. After an Application Server instance starts, the Agent communicates with the Application Server instance to gather monitoring data and invoke management actions.

In accordance with an embodiment, each instance of the system environment includes one or more Agents 301. The one or more Agents 301 is responsible for managing and storing its configuration information; providing ongoing visibility into the amount of resources that the system is using for a given resource pool; controlling the life cycle of JVMs in a resource pool upon request from the Controller; gathering metrics and monitoring data of its instantiated JVMs and making this data available to the Controller; and, providing logging and audit trails.

Administration Console

Figure 4:
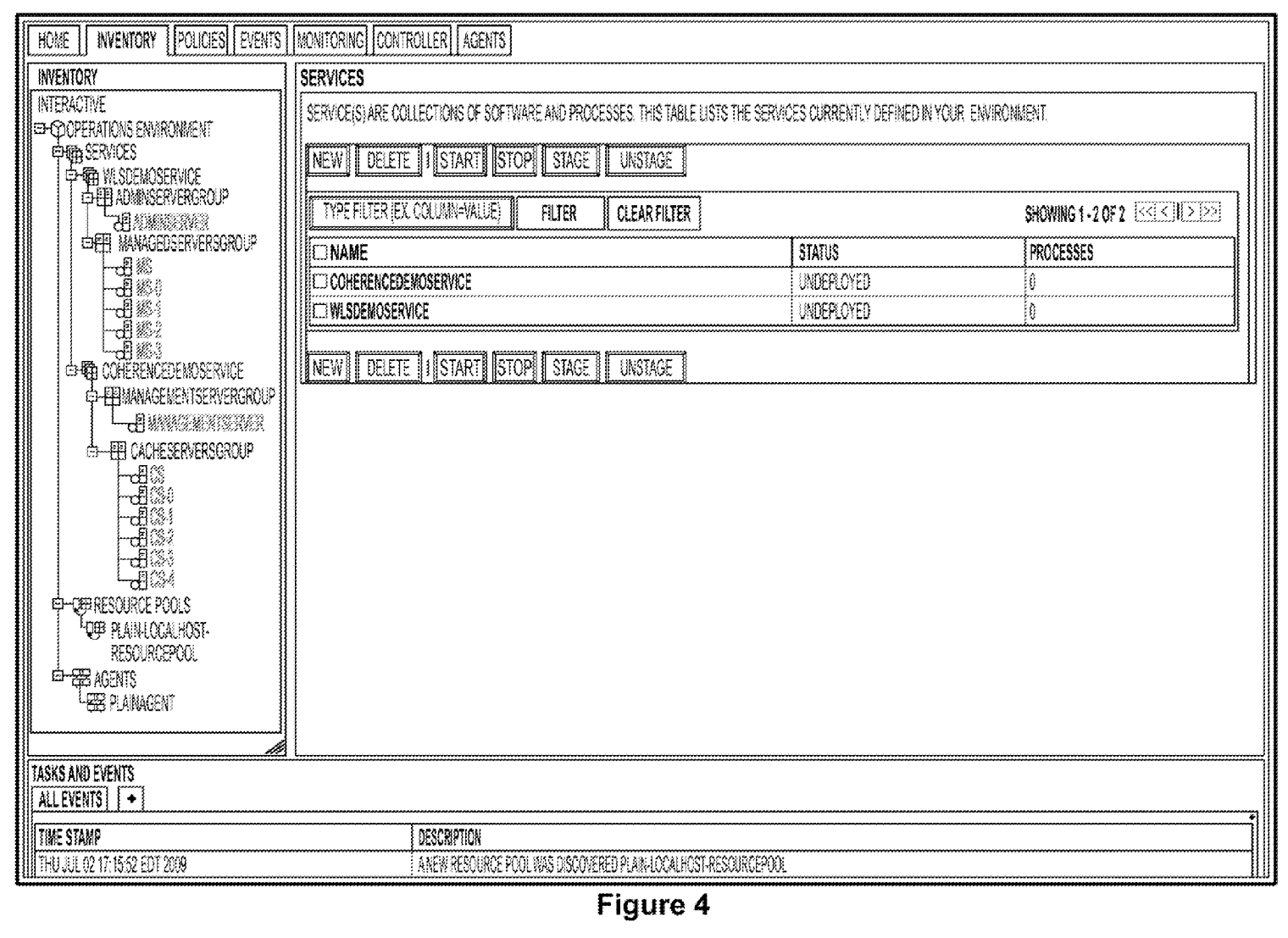

FIG. 4 is an illustration that shows a screenshot of an Administrative Console or interface. In accordance with an embodiment the Administration Console is a browser-based, graphical user interface that the administrator can use to configure, manage, and monitor services in the operations center. The interface can be hosted by the Controller, which communicates with Agents to gather monitoring data and to invoke management actions.

In one embodiment, the Administration Console can configure network communications for Controllers and Agents; organize computing resources into resource pools; organize Java applications into services; create policies to enforce SLA for services automatically; configure logging and auditing features; create users and assign them to groups and roles; deploy and activate services; invoke actions to manually affect services; monitor the performance of services; monitor the use of computing resources on machines that host resource pools; and, view Controller log files and security auditing files.

Administration Console and Configuration of Services

Figure 5:
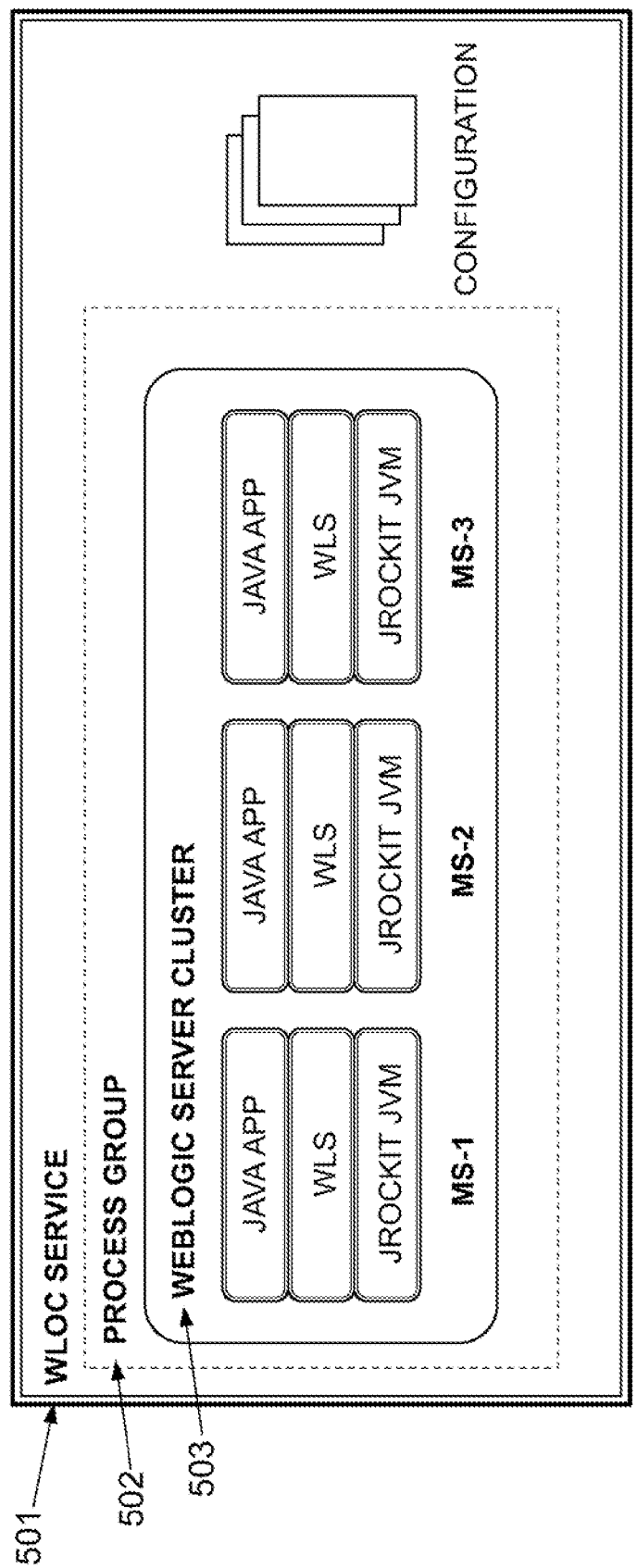
FIG. 5 is an illustration that shows the architecture of a system for deploying and managing software services as process groups and clusters, in accordance with an embodiment.

FIG. 5 is an illustration that shows the architecture of a system for deploying and managing software services as process groups and clusters, in accordance with an embodiment. A service is a collection of one or more processes that the system manages as a unit. Each process in a service is a software stack starting from the Java Virtual Machine (JVM), including the classes that are running in the JVM. Typically, processes that perform the same function are organized into process groups. (For example, all of the servers in a cluster can be organized within a process group). The administrator can specify attributes for each process group such as:

The number of instances of the process groups to create initially and the minimum and maximum number of process instances allowed for the service;

The minimum amount of resources that the process requires and an upper limit of resources that the process can use. The system reserves the minimal resources for exclusive use by the process and grants additional resources if they are available;

A priority for the service, which the system uses to resolve conflicts when more than one service fails to meet its SLA at the same time;

Any information required by the system in order to deploy processes, including the main class, JVM startup arguments, and software dependencies;

A ready metric, which the system uses to determine when a process has been successfully started and can be monitored; and Any software dependencies including the name and location of the software that the processes require to run.

The administrator can also define one or more policies that specify the deployment or runtime requirements (constraints) for the service and the actions to take if the SLA constraint is not met. For example, a policy can be used to expand or shrink a service's footprint in response to the runtime environment. Constraints can be placed on a process, a group of processes, or all processes in a service. In accordance with an embodiment, constraints can be based on a calendar value, or, if the managed processes expose management data through Java Management Extensions (JMX), then by constraining the value of an MBean attribute in the processes.

For example, in FIG. 5, an administrator can create a service 501 that specifies a process group 502 for a collection of externally-facing web services, all of which run on a single application server cluster 503, and can configure the process group 502 as follows:

Resource Minimum=Reserve 400 CPU cycles, 600 MB RAM.

Resource Maximum=Allow services to use up to 800 CPU cycles, 800 MB RAM.

Resource Priority=Specify highest priority over all other services.

Initial Deployment State=Start Administration Server and two Managed Servers.

For example, a policy can be created that starts an additional cluster member during business hours. A second policy can be created that starts two additional members if servlet response time drops below 2 seconds, and that stops the additional members if response time is faster than 0.1 second. When the service is deployed, the system reserves the prescribed 400 CPU cycles and 600 MB of RAM for exclusive use by the service. As the system adds processes to the service, it requests additional resources for use by the service up to the maximum. If the additional resources are currently being used by other processes, the system can remove resources from lower-priority processes, as long as each process retains its minimal reserve.

Administration Console and Monitoring of Services and System Resources

Figure 6:
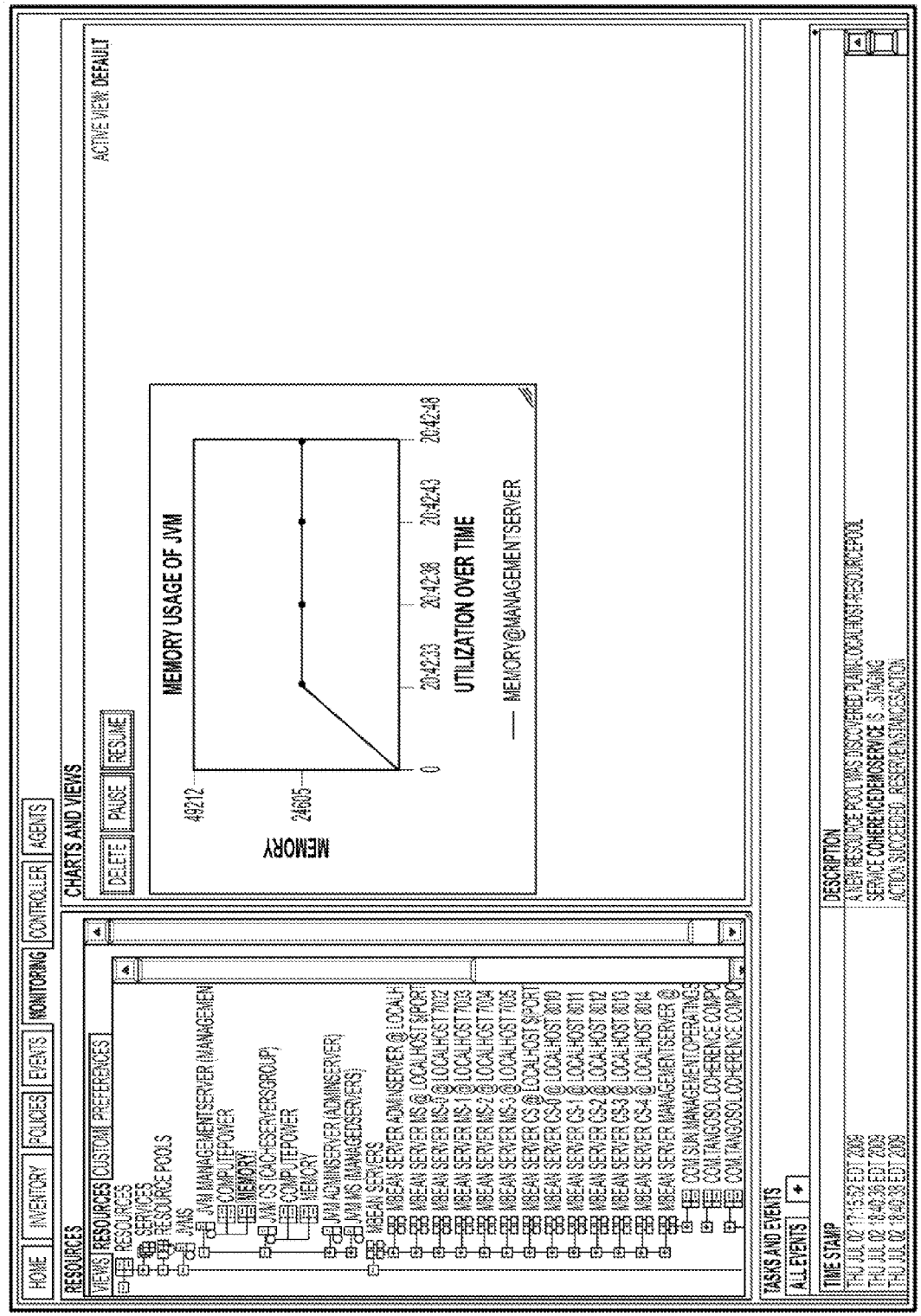
FIG. 6 is an illustration that shows another screenshot of an Administrative Console interface that displays metrics, in accordance with an embodiment.

FIG. 6 is an illustration that shows another screenshot of an Administrative Console interface that displays metrics, in accordance with an embodiment. The performance of system resources can be charted using charts and graphs that describe the amount of resources the service is using from a resource pool relative to the amount of resources available, and the runtime statistics from each JVM within the service.

In accordance with an embodiment, services and system resources can be monitored based on:

Information about events and action that have occurred in the environment and the time that they occurred;

Actions that are currently pending and that require approval;

Notifications that are triggered when a service operates outside of a policy constraint. The administrator can configure the system to generate notifications using Java Message Service (JMS), Java Management Extensions (JMX), Simple Mail Transfer Protocol (SMTP), and Simple Network Management Protocol (SNMP);

Log messages about events such as the deployment of services or the failure of one or more actions; and Audit messages that capture changes to the Controller, Agents, or service configuration.

Administration Console and Security

Figure 7:
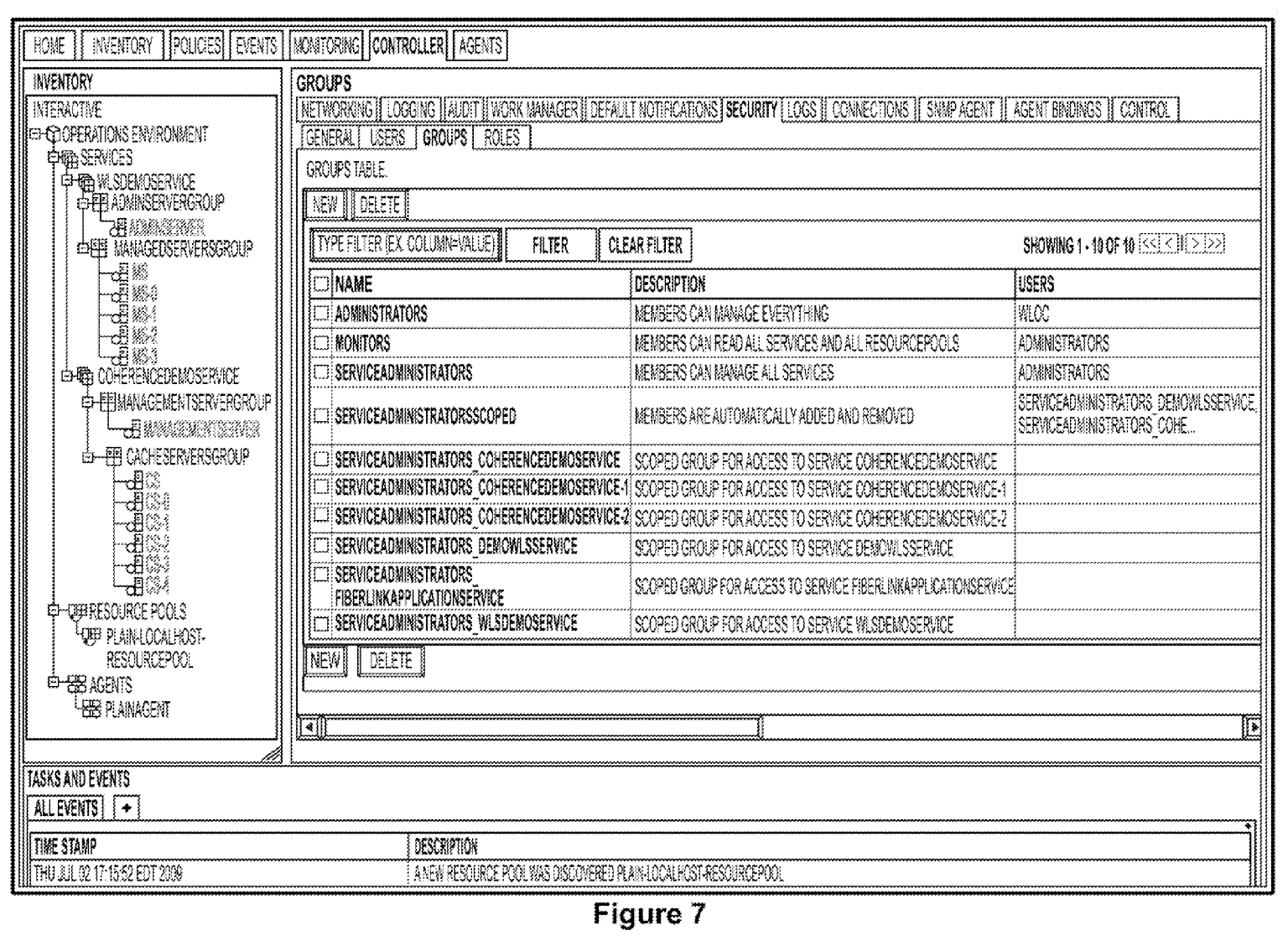

FIG. 7 is an illustration that shows another screenshot of an Administrative Console interface that allows for setting of filters. In accordance with an embodiment, the system uses role-based access control to enable an administrator to assign different levels of privileges to different users or groups. The system also includes a set of security roles with pre-configured access privileges, and groups that can be configured to be in one or more of the defined security roles. An administrator can then create users and assign them to groups, or directly to security roles.

Security Management in a Virtual Environment

The system security can be achieved either through the environment or as part of the system itself. For example, if the system is installed on a secure server behind multiple firewalls with only a single Administrator who is completely trusted, there is arguably no need for the system to handle the security management. On the other hand, the system needs to handle security concerns when the environment does not provide for total security.

When analyzing security threats, one needs to consider vectors, exploits and disclosures. A vector is the access to the resource that is required to take advantage of vulnerability such as an unfettered remote access. An exploit is a way to take advantage of vulnerability such as allowing an attacker to inject malicious code into the environment. A disclosure is the leaking of data that might aid an attacker in an exploit (e.g. leaking of sensitive IP addresses from behind a firewall, or leaking passwords in clear text).

In some examples, machines have operating system (OS) user accounts held only by trusted users. The file system directories are also protected such that only trusted users can have read, write, and execute access. In addition, the firewalls are used to protect the network used by the system.

Figure 8:
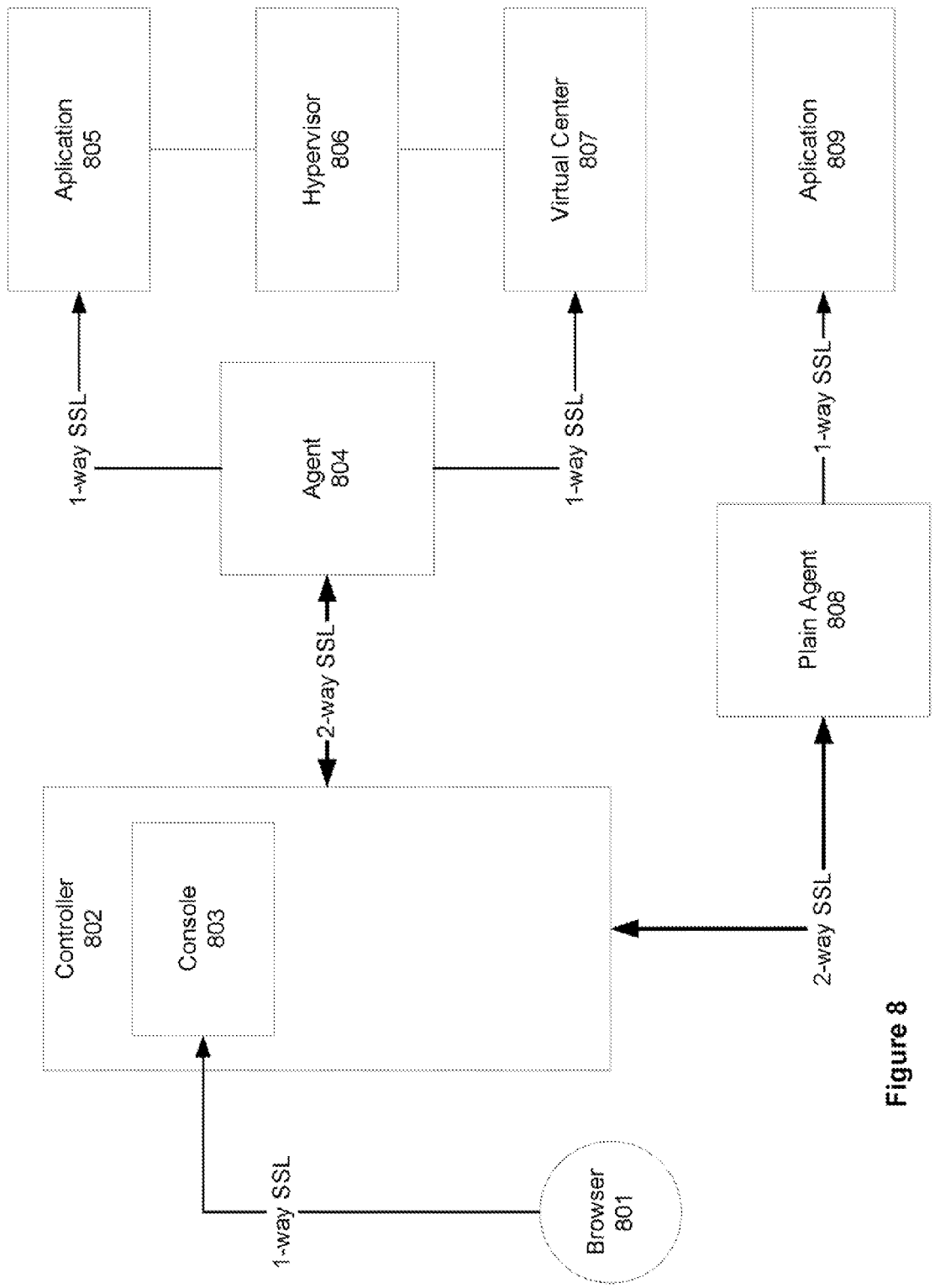
FIG. 8 is an illustration that shows security management in both a non-virtualized and virtualized environment, in accordance with an embodiment.

FIG. 8 is an illustration that shows security management in a physical and a virtual environment. As shown in FIG. 8, the Security Management in such as environment needs to address traffic/access to the Console 803; Console 803/Controller 802 API Granularity; Log Security; Credentials; Keystores; Controller 802 to Agent(s) 804 or 808 Communication; Agent 804 or 808 to Application 805 or 809 Communication; Agent 804 to Virtual Center 807 Communication.

Traffic/Access to the Console

Network traffic from the administrator's browser 801 to the Console 803 running in the Controller 802 needs to be protected from snooping and tampering. In accordance with an embodiment, the connection can be protected from snooping and tampering as well as a man-in-the-middle attack by using a 1-way Secure Sockets Layer (SSL) for the browser 801 to Console 803 connections unless http is allowed. In one embodiment, Console operations need to be protected from access by unauthenticated users. The Console 803 can be protected from unauthenticated users by requiring users to provide a valid username and valid password.

In one example, an attacker with access to the network between the Controller 802 and the browser 801 can snoop the credentials used to authenticate an administrator with the Console 803 off of the wire or the attacker could set up a man-in-the-middle attack and carry out unauthorized operations via the Console 803.

In one embodiment, traffic from browsers 801 to the Console 803 can use a 1-way SSL. The 1-way SSL can protect the traffic from an attacker snooping sensitive data off of the wire, can protect traffic from an attacker tampering with the data on the wire, and can protect against a man-in-the-middle attack.

An identity Java Key Store (JKS) can be created at install time. A self-signed Controller certificate containing the hostname of the Controller 802 can be created and stored in the identity JKS keystore. The configuration file can be modified to point to the identity keystore.

Once the 1-way SSL connection is established, the user is required to authenticate with the Console 803 before being granted access to the Console 803.

Console/Controller API Granularity

Access to Console functions and Controller APIs need to be restricted to authorized users. Access can be based on the role the authenticated user is holding at the time they attempt to access the Console data/operation or the Controller APIs.

In one example, third parties may have different levels of trust for different administrators. These individuals of lesser character might shutdown applications maliciously or negatively affect the customer's running applications by obtaining Virtual Center credentials.

In one embodiment, Console functions and the Controller APIs that are used by the Console 803 can be protected using role based authorization control (RBAC). Users that successfully authenticate can be given roles. Access to Console functions and Controller APIs can be restricted according to the roles held by the user.

Anonymous users (i.e. non-authenticated users) may not have any access to the Console functions or to Controller APIs. At install time, the user installing the software selects a username to be part of the Administrators group. The installer needs to create a filestore for the authentication provider. The installer can create the username and ensure that it is placed in the Administrators group. The password can be hashed using the SHA-256 algorithm.

The authentication file based provider filestore can define who are the Administrators, ResourceAdminstrators, ServiceAdministrators, or Monitors. In one embodiment, the Console 803/Controller 802 can define the roles of Administrators, ResourceAdminstrators, ServiceAdministrators, or Monitors.

When a service is defined, a role is dynamically defined for that particular service, instead of being manually created by the Administrator. One example for the name of the role is ServiceAdmin_Service, where the name of the role depends upon the service for which admin or monitor access is being granted, i.e. Service is replaced by the name of the service.

When a resource pool is defined, a role is defined for that particular resource pool. One example for the name of the resource pool is ResourceAdmin_Resource, where the name of the role depends upon the resource pool for which admin or monitor access is being granted, i.e. Resource is replaced by the name of the resource. Before allowing read or write access to pages or functions, the Console can check to see if user has access to the page or function. A Monitor can read all resources/pools and all services/applications.

In one embodiment, ServiceAdmin_Service roles can be defined to deploy/undeploy a specific service; apply/bind rules to a specific service; read/write credentials for only a specific service; read access to service for the purpose of monitoring; and approve notifications for adjudications for the specific service. A ServiceAdmin role can perform everything that a Monitor can. In addition, the ServiceAdmin role can deploy/undeploy any services; apply/bind rules to any service; read/write credentials for any service; read access to any services for the purpose of monitoring; and approve notifications for adjudications for any services.

In one embodiment, ResourceAdmin_Resource roles can be defined to change configuration (CRUD) for a specific resource pool and provide read access to a specific resource pool for the purpose of monitoring. A ResourceAdmin role can perform everything that a Monitor can. In addition, the ResourceAdmin role can change configuration (CRUD) for all resource pools and provide read access to all resource pools for the purpose of monitoring. In addition, an Admin role can perform everything the others can do.

In one embodiment, the Admin role can also create users and groups; create new roles; create new policy; define rules; approve all notifications after adjudication is requested; and change LOC configuration for Controller and Agent capabilities.

When a service or resource/pool is added to the virtual environment, policies can be created using the console 803 to grant restricted access to just that service or resource/pool to a specific role or specific groups. Using the Console that role can then be assigned to a specific user or users.

Log Security

Data in the logs/audit does not contain any sensitive data such as passwords whether in log messages or stack traces printed to the log or standard output.

In one example, a remote untrustworthy administrator might be able to glean sensitive data that could be used to attack the authentication process by viewing stack traces with sensitive data or lead to an escalation of privileges. If the customer does not properly secure the machine on which the controller is running, an untrustworthy user with read access to the file system might be able to glean sensitive data from logs that could be used to escalate privileges or launch an attack.

In one embodiment, it is important to make sure that logs/audit does not contain any sensitive data such as passwords in Log messages, Stack traces, Context information that might be printed out, and Debug messages. The security concern also needs to be addressed in data sent to standard output. Logs, audit files, and debug logs can all be properly protected by OS file protection from unauthorized viewing.

Credentials

Passwords can be properly protected so that remote applications (application server, Virtual Center) and the System are not compromised by an attacker. This includes not echoing passwords in the console, not putting them into String objects in memory, and ensuring that they are encrypted when saved to disk.

In one example, if a third party does not properly secure the machine on which the controller is running, an untrustworthy user with read access to the file system might be able to read any unencrypted credentials for the Virtual Center or applications.

In one embodiment, the Core Security Service (CSS) CredentialMappingService backed by the file-based provider can be used to retrieve third party credentials using the getCredentials method. Credentials can be stored by calling the setUserPasswordCredential method on the UserPasswordCredentialMapEditorMBean. The Credentials include credentials for accessing the Virtual Center as well as credentials for the various containers controlled by Agents. Some of the Credentials, such as the passwords, are be stored in String objects but in char arrays, and are not echoed in the Console in clear text. In addition, passwords, when saved to disk, are encrypted.

The Controller 802 can be configured to use the credential mapping service with the CSS File Based Providers available.

Keystores

Keystores are used to protect private keys. Keystores need to be properly protected to prevent unauthorized users from accessing private keys and using those keys to present themselves as trusted.

In one embodiment, identity keystores can be used to store the Controller 802 and Agent(s) 804 or 808 private keys. Trust keystores can be used to store certificates trusted by the Controller 802 and Agent(s) 804 or 808. The keystores can be password protected. In one embodiment, keystore requirements differ between the Controller 802 and the Agent 804 or 808.

The Controller 802 uses keystores for the 1-way SSL connections from clients to the console, as well as for the 2-way SSL connections with Agent(s) 804 or 808. In support of the SSL connections, the Controller 802 can use three keystores.

An identity keystore is needed by the Controller 802. The Controller's identity keystore can contain the Controller's private key and the Controller's certificates used when doing 1-way SSL with a browser which is attempting to access the Console. In one example, the console identity keystore is used by Tomcat but configured via the SSLConfigMBean.

The internal identity keystore used by the Controller 802 is for the 2-way SSL connection to Agents and, consequently, is intended to be internal. The installer can create a self-signed private key and certificate for the Controller, but this certificate and private key are not intended to be replaced as they can be used in the 2-way SSL connection between the Controller 802 and Agent(s) 804 or 808. In one example, the internal identity keystore is used by an application server and configured via JSSE system properties.

An internal trust keystore is needed by the Controller 802 when doing 2-way SSL with the Agent(s) 804 or 808. This keystore contains a copy of each Agent's certificate which can be used to validate that the Agent's certificate is trusted. In one example, the internal trust keystore is used by an application server and configured via JSSE system properties.

The Agent 804 or 808 uses keystores for the 2-way SSL connection with the Controller 802. In support of the SSL connections, the Agent 804 or 808 can also use three keystores.

The internal identity keystore is used for the 2-way SSL connection to the Controller 802 and, consequently, is intended to be internal. The installer creates a self-signed private key and certificate for the Agent, but this certificate and private key are not intended to be replaced as they can be used in the 2-way SSL connection between the Agent 804 or 808 and Controller 802. In one example, the internal identity keystore is used by Jetty and configured via the SSLConfigMBean.

An internal trust keystore can be used by the Agent 804 or 808 when doing 2-way SSL with the Controller 802. This keystore contains a copy of the Controller certificate which is used to validate that the certificate presented by the Controller 802 in the 2-way SSL handshake does, in fact, belong to the Controller 802. In one example, the internal trust keystore is used by Jetty and configured via the SSLConfigMBean.

The Agent 804 or 808 uses an application trust keystore to interact with some applications using 1-way SSL with a username/password in order to interact with the application's JMXServer. The Agent also has a certificate or Certificate Authority certificate for the application installed at the time an application is configured if 1-way SSL is to be used. In one example, the application trust keystore is used by JSSE in the Agent to trust a remote application.

Controller to Agent(s) Communication

Communication between the Controller 802 and the Agent(s) 804 or 808 needs to be protected from an attacker snooping sensitive data that might be on the wire, from an attacker tampering with data on the wire and from a man-in-the-middle attack. SSL can be used to protect the "pipe" between the Controller and the Agent(s). In accordance with an embodiment, the Controller and each Agent has a password set by the user when the Controller or Agent is configured. That password is used to encrypt all credentials that pass between the Controller and Agent in addition to any message level security that may or may not be in place via SSL. The means that in all cases credentials are protected when they are on the wire from snooping by an attacker.

In one embodiment, message level security can be used for confidentiality, integrity and identity propagation which can obviate the need to secure the entire pipe with SSL. In one example, a malicious user inside the firewall calls an unprotected Agent web services end-point to start/stop applications or JVMs. A malicious user inside the firewall has access to the Virtual Center (in the case of a virtualized Agent) or to a machine where a plain Agent is running and can start up a rogue Agent. If the rogue Agent successfully convinces an Administrator that it is not a rogue Agent and the Administrator registers it with the Controller, it might be possible for the rogue Agent to be configured such that it feeds incorrect metrics to the Controller, thereby causing incorrect actions. A malicious user inside the firewall might be able to snoop Virtual Center credentials off of the wire when the Controller passes the credentials to an Agent. If they can access the Virtual Center, then the stolen credentials would allow them to interact with the Virtual Center. If application credentials are passed across the wire from the Controller to the Agent(s) a malicious user inside the firewall might be able to snoop application credentials off of the wire which would allow them (if they had access to the Virtual Center) to start up the application. If application credentials are not passed across the wire then this is not a threat.

In one embodiment, Controller communication with Agent(s) can be secured using 2-way SSL (mutual authentication) so that each end of the communications pipe can be sure of the identity of the party on the other end of the pipe. In one example, the Controller can act as a client to initiate a connection to a web service in the Agent which acts as the server. Once a secure channel is established between the Controller 802 and an Agent 804 or 808, the Controller 802 can invoke appropriate web services endpoints in the Agent 804 or 808 to retrieve metric data. This means that there can be a separate SSL connection for each Controller/Agent pair.

Agent web services endpoints can only be available over https so that they are protected from unauthorized access. In one example, there are no authentication or authorization mechanisms in the Agents so perimeter security is called for. The 2-way SSL gate provides the only security and it is expected that once the connection is established the caller is trustworthy.

The configuration to enable 2-way SSL between the Controller 802 and Agent 804 or 808 can be configured at some point subsequent to Agent installation but before the Agent is started. Subsequently, when the Controller contacts the Agent web service endpoints it can be done using https and the secure port that has been set up on the Agent. In effect, the pipe is being secured rather than applying security at the message level.

At Agent install time, in order to have secure communications between the Controller and Agent(s), appropriate certificates need to be on each side of the communications pipe. The Controller's internal certificates and internal keys are set up when the Controller 802 is installed.

A manual process can also be employed. A user (or installer) uses the keytool to create a self-signed certificate for the Agent, along with a private key which is placed in the internal identity keystore. The user (or installer) on the Agent machine exports the Agent certificate to a file. The user copies the exported Agent certificate to the Controller machine. The user on the Controller machine copies the Agent certificate into the internal trust keystore. The user on the Controller machine exports the controller internal certificate into a file. The user on the Agent machine loads the controller internal certificate into the Agent's internal trust keystore. The Agent needs to be configured to listen for https 2-way SSL connections and to be able to find the keystores. If no JMX connections are needed for applications or if they have already been configured, the Agent can be started.

At run time when using the Controller is acting as a client, one configures it for 2-way SSL (mutual authentication) by directly configuring the default keystores or by specifying system properties.

In one embodiment, firewalls exists in inconvenient places, such as between the Controller 802 and the Agent(s) 804 or 808. Third parties want to protect Agent(s) from other portions of their network and put one or more firewalls between the Controller 802 and the Agent(s) 804 or 808. It means that communication between the Controller 802 and Agents 804 or 808 becomes problematic given the plans to use https for the connection between the Controller 802 and Agents 804 or 808. Also, a firewall blocks inbound traffic initiated from outside the firewall which means that a Controller cannot initiate a contact to an Agent behind a firewall. Also, Network Address Translation (NAT) is done by the firewall. Hence, the Controller does not know the internal IP address of an Agent it wants to contact.

In some embodiments, initiating contact from the Agent to the Controller does not solve the problem because to have the Controller use https to access web services hosted on the Agent and https is not bi-directional, i.e. having the Agent initiate the connection to the Controller does not allow the Controller to invoke a web service on the Agent.

One solution is to set up a port forwarding through the firewall for every Agent instance which can be an administrative burden and in some sense can defeat the purpose of the firewall.

Another solution is to set up a ControllerConcentrator behind each firewall and set up port forwarding through the firewall to that ControllerConcentrator. The ControllerConcentrator can pass traffic from Agents behind the same firewall to the Controller outside the firewall and pass traffic from the Controller outside the firewall to Agents behind the firewall. If https is used, certificates can be set up for the Controller, the ControllerConcentrator and the Agents.

Another possible solution is to use a secure protocol other than https which supports bi-directionality. This allows an Agent to initiate a connection to the Controller, keep the connection alive and the Controller could invoke operations on the Agent using that connection. The firewall allows the bi-directional protocol to pass through the firewall. In one embodiment, third parties that want to set up firewalls can punch holes in the firewall and do port forwarding for each Agent behind the firewall.

Agent to Application Communication

The Agent 804 or 808 interacts with the application 805 or 809 using JMX to retrieve data about the application or change the behavior of the application. The communication needs to be protected from sensitive data (such as application credentials) being snooped or modified. In other embodiments, other mechanisms in addition to JMX can be used.

In one example, if application credentials are passed across the wire from the Agent to the application a malicious user inside the firewall might be able to snoop application credentials off of the wire which would allow them to potentially damage the application to the extent that access to the JMX-Server allows tampering.

In another embodiment, the Agent JMX communication with applications can be secured using 1-way SSL with an application username/password to preclude application credentials being stolen or instructions to the JMXServer being modified.

The configuration to enable 1-way SSL between the Agent 804 or 808 and application 805 or 809 can be configured subsequent to Agent installation but before the Agent is started. Subsequently, when the Agent contacts the application JMXServer, the configuration can be done using an object request brokers protocol, such as Internet Inter-Orb Protocol (IIOP), layered over the SSL protocol and the secure port is set up on the application. In effect, the pipe is being secured rather than applying security at the message level. As far as the application is concerned the Agent can be identified as the application user that matches the Agent provided credentials.

At install time, in order to have secure communications between the Agent and the application, appropriate certificates need to be on each side of the communications pipe. In one embodiment, a manual process can be employed. At install time, the application's certificate is copied and installed in the Agent's internal trust keystore. Then, the Agent can be started.

Agent to Virtual Center Communication

In one embodiment, the Agent 804 interacts with Virtual Center 807 via web services to start/stop JVMs. Credentials for a valid Virtual Center 807 user need to be passed to Virtual Center 807. The communication needs to be protected so that the Virtual Center credentials are not snooped and data is protected from tampering.

In one example, if Virtual Center credentials are passed across the wire from the Agent to the Virtual Center a malicious user inside the firewall might be able to snoop Virtual Center credentials off of the wire which would allow them unauthorized access to the Virtual Center.

In one embodiment, the Agent 804 communication with the Virtual Center 807 can be secured using 1-way SSL with a Virtual Center 807 username/password to preclude the Virtual Center credentials being stolen or instructions to the Virtual Center 807 from being modified by an unauthorized user.

The configuration to enable 1-way SSL between the Agent 804 and Virtual Center 807 can be configured at some point subsequent to Agent installation but before the Agent 804 is started. Subsequently, when the Agent 804 contacts the Virtual Center 807, the configuration can be done using HTTPS and the secure port that has been set up on the Virtual Center. In effect, the pipe is being secured rather than applying security at the message level.

At install time, in order to have secure communications between the Agent 804 and Virtual Center 807, appropriate certificates need to be on each side of the communications pipe. In one embodiment, a manual process can be employed. At install time, the Virtual Center's certificate is copied and installed in the Agent's internal trust keystore. Then, the Agent can be started.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a JRockit environment, other application servers, virtual machines, JVMs, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting security management in a computing environment, the system comprising:
    a plurality of computer systems wherein each computer system comprises a microprocessor, a memory, and a hypervisor operating on the microprocessor;
    a plurality of virtual machines, wherein each virtual machine comprises one or more applications providing one or more services, and wherein each virtual machine operates on one of the plurality of computer systems;
    a plurality of agents, wherein an agent resides on each of the plurality of computer systems, and wherein said agent communicates with the one or more applications operating on said computer system using a channel secured with a one-way authentication method;
    a plurality of virtual centers wherein a virtual center resides on each of the plurality of computer systems, and wherein the agent residing on said each of the plurality of computer systems communicates with the virtual center residing on said each of the plurality of computer systems using a channel secured with the one-way authentication method;
    a controller which communicates with each of the plurality of agents using a channel secured with a mutual authentication method to collect data from the plurality of agents about current operating performance of the computing environment; and
    wherein, in response to collecting said data, the controller communicates with said plurality of virtual centers via said plurality of agents to start and stop virtual machines of said plurality of virtual machines in a way that honors one or more service level agreements for said one of more services provided by said one or more applications of said plurality of virtual machines.

2. The system according to claim 1, wherein:
    the mutual authentication method is a two-way Secure Sockets Layer (SSL) method, and the one-way authentication method is one-way SSL.

3. The system according to claim 1, further comprising:
    an administrative console hosted by said controller, wherein said administrative console allows an administrator to deploy services into the computing environment, and to specify for each service a service level agreement.

4. The system according to claim 3, wherein:
    network traffic from a browser of said administrator to the administrative console is protected by using one-way SSL and access to the administrative console and the controller is determined by a role that an authenticated user is holding at the time of accessing.

5. The system according to claim 1, further comprising:
    a controller concentrator behind a firewall which provides port forwarding through the firewall for communications between said plurality of agents and said controller.

6. The system according to claim 1, wherein:
    the agent interacts with the virtual center on each computer system using web services to control virtual machine instances, wherein the communication between the agent and the virtual center is secured using a username and password to preclude the virtual center credentials from being stolen or instructions to the virtual center from being modified by an unauthorized user.

7. The system according to claim 1, wherein:
    the one-way authentication method is secured with an application username and password to preclude application credentials from being stolen and/or instructions from being modified.

8. The system according to claim 1, further comprising:
    a keystore to store one or more private keys for the controller and the plurality of agents.

9. The system according to claim 8, wherein:
    the keystore is an internal identity keystore and/or an internal trust keystore that can be used to secure the interaction between the controller and the plurality of agents using the mutual authentication method.

10. A method for supporting security management in a computing environment comprising a plurality of computer systems and a plurality of virtual machines each comprising one or more applications providing one or more services, and wherein each virtual machine operates on one of the plurality of computer systems, the method comprising:
    providing a plurality of agents wherein an agent resides on each of the plurality of computer systems in the computing environment;
    providing a plurality of virtual centers wherein a virtual center resides on each of the plurality of computer systems;
    providing a communication channel secured with a one-way authentication method between the agent and the virtual center residing on each of the plurality of computer systems;
    providing a communication channel secured with a one-way authentication method between the agent and the virtual machines residing on each of the plurality of computer systems;
    providing a communication channel secured with a mutual authentication method between the plurality of agents and a controller;
    collecting, at the controller, data from the plurality of agents about current operating performance of the computing environment; and
    communicating from said controller to said plurality of virtual centers via said plurality of agents, in response to said collecting, data to start and stop virtual machines of said plurality of virtual machines in a way that honors one or more service level agreements for said one of more services provided by said one or more applications of said plurality of virtual machines.

11. The method according to claim 10, wherein:
    the mutual authentication method is a two-way Secure Sockets Layer (SSL) method, and the one-way authentication method is one-way SSL.

12. The method according to claim 10, further comprising:
    providing, an administrative console hosted in said controller that allows an administrator to deploy services into the computing environment, and to specify for each service a service level agreement.

13. The method according to claim 12, further comprising:
    protecting network traffic from a browser of the administrator to the administrative console using one-way SSL and access to the administrative console and the controller is determined by a role that an authenticated user is holding at the time of accessing.

14. The method according to claim 10, further comprising:
providing a controller concentrator behind a firewall to provide port forwarding through the firewall to the controller concentrator.

15. The method according to claim 10, further comprising:
for each computer system of the plurality of computer systems, allowing the agent to interact with the virtual center using web services to control virtual machine instances, wherein communication between the agent and the victual center is secured using a username and password to preclude the virtual center credentials from being stolen by an unauthorized user.

16. The method according to claim 10, further comprising:
securing the one-way authentication method with an application username and password to preclude application credentials from being stolen and/or instructions from being modified.

17. The method according to claim 10, further comprising:
providing a keystore to store one or more private keys for the controller and the plurality of agents, wherein the keystore is one of:
an internal identity keystore and/or an internal trust keystore that can be used to secure the interaction between the controller and the plurality of agents using the mutual authentication method,
an identity keystore that can be used by the controller to interact with a browser using the one-way authentication method, and
an application trust keystore that can be used by an agent to interact with an application using the one-way authentication method.

18. A non-transitory machine readable medium having instructions stored thereon for supporting security management in a computing environment comprising a plurality of computer systems and a plurality of virtual machines each comprising one or more application providing one or more services, and wherein each virtual machine operates on one of the plurality of computer systems, which instructions, when executed cause a system to perform steps comprising:
providing, a plurality of agents wherein an agent resides on each of the plurality of computer systems in the computing environment;
providing a plurality of virtual centers wherein a virtual center resides on each of the plurality of computer systems;
providing a communication channel secured with a one-way authentication method between the agent and the virtual center residing on each of the plurality of computer systems;
providing a communication channel secured with a one-way authentication method between the agent and the virtual machines residing on each of the plurality of computer systems;
providing a communication channel secured with a mutual authentication method between the plurality of agents and a controller;
collecting, at the controller, data from the plurality of agents about current operating performance of the computing environment; and
communicating from said controller to said plurality of virtual centers via said plurality of agents, in response to said collecting, data to start and stop virtual machines of said plurality of virtual machines in a way that honors one or more service level agreements for said one of more services provided by said one or more applications of said plurality of virtual machines.

* * * * *

UNITED STATES PATENT AND TRADEMARK OFFICE
CERTIFICATE OF CORRECTION

| | | |
|---|---|---|
| PATENT NO. | : 9,129,104 B2 | Page 1 of 1 |
| APPLICATION NO. | : 13/866954 | |
| DATED | : September 8, 2015 | |
| INVENTOR(S) | : Ferwerda et al. | |

It is certified that error appears in the above-identified patent and that said Letters Patent is hereby corrected as shown below:

In the drawings,

Drawing sheet 1 of 8, Figure 1, line 18, delete "Architechture" and insert -- Architecture --, therefor.

Drawing sheet 2 of 8, Figure 2, line 3, delete "Visulization" and insert -- Visualization --, therefor.

Drawing sheet 8 of 8, Figure 8, line 1, under reference numeral 805, delete "Aplication" and insert -- Application --, therefor.

Drawing sheet 8 of 8, Figure 8, line 1, under reference numeral 809, delete "Aplication" and insert -- Application --, therefor.

In the specification,

Column 11, line 10, delete "ResourceAdminstrators," and insert -- Resource Administrators, --, therefor.

Column 11, line 13, delete "ResourceAdminstrators," and insert -- Resource Administrators, --, therefor.

In the claims,

Column 18, line 58, claim 12, delete "providing," and insert -- providing --, therefor.

Column 19, line 10, claim 15, delete "victual" and insert -- virtual --, therefor.

Column 20, line 6, claim 18, delete "providing," and insert -- providing --, therefor.

Signed and Sealed this
Seventh Day of June, 2016

Michelle K. Lee
*Director of the United States Patent and Trademark Office*